United States Patent [19]

Gerber et al.

[11] Patent Number: 5,189,129
[45] Date of Patent: Feb. 23, 1993

[54] HIGH TEMPERATURE POLYMER FROM MALEIMIDE-ACETYLENE TERMINATED MONOMERS

[75] Inventors: Margaret K. Gerber, Cincinnati, Ohio; Terry L. St. Clair, Poquoson, Va.

[73] Assignee: The United States of America as represented by the Administrator of the National Aeronautics and Space Administration, Washington, D.C.

[21] Appl. No.: 801,868

[22] Filed: Dec. 3, 1991

Related U.S. Application Data

[63] Continuation-in-part of Ser. No. 528,666, May 18, 1990, abandoned.

[51] Int. Cl.$^5$ .......................................... C08F 222/40
[52] U.S. Cl. .................................. 526/262; 526/285; 528/322
[58] Field of Search ................. 526/262, 285; 528/322

[56] References Cited

U.S. PATENT DOCUMENTS

| | | | |
|---|---|---|---|
| 3,879,349 | 4/1975 | Bilow et al. | 260/47 |
| 4,108,836 | 8/1978 | Bilow | 528/128 |
| 4,276,407 | 6/1981 | Bilow et al. | 528/272 |
| 4,365,034 | 12/1982 | Grimes et al. | 524/256 |

*Primary Examiner*—Harold D. Anderson
*Attorney, Agent, or Firm*—George F. Helfrich

[57] ABSTRACT

Thermally stable, glassy polymeric materials were prepared from maleimideacetylene terminated monomeric materials by several methods. The monomers were heated to self-polymerize. The A-B structure of the monomer allowed it to polymerize with either bismaleimide monomers/oligomers or bis-acetylene monomers/oligomers. Copolymerization can also take place by mixing bismaleimide and bisacetylene monomers/oligomers with the maleimide-acetylene terminated monomers to yield homogenous glassy polymers.

31 Claims, No Drawings

HIGH TEMPERATURE POLYMER FROM MALEIMIDE-ACETYLENE TERMINATED MONOMERS

ORIGIN OF THE INVENTION

The invention described herein was made in the performance of work under a NASA contract and is subject to the provisions of Section 305 of the National Aeronautics and Space Act of 1958, as amended, Public Law 85-568(72 Stat. 435; 42 USC 2457).

CROSS-REFERENCE

This application is a continuation-in-part of copending application Ser. No. 528,666, filed May 18, 1990, now abandoned.

BACKGROUND OF THE INVENTION

1. Field of the Invention

The present invention relates generally to polyimides which are suitable for high temperature applications as a result of their high or nondetectable glass transition temperature and their high thermooxidative stabilities. It relates particularly to three series or types of polyimides which are prepared from maleimide-acetylene terminated monomers.

2. Description of Related Art

Polyimides that are prepared from the reaction of organic compounds containing pendant acetylene groups or organic oligomers containing pendant acetylene groups are well known for their thermooxidative stability and exceptionally high glass transition temperatures. Likewise, organic compounds or oligomers containing activated carbon-carbon double bonds can be used to prepare polymers which are thermally stable if these compounds or oligomers contain imide moieties (i.e. maleimides).

However, polymers prepared from these compounds are often brittle and difficult to process. Bilow et al. (U.S. Pat. No. 4,108,836) developed a process for preparing alcohol soluble polyimide precursors which can be imidized in situ and cured through acetylene end groups. In a later invention, Bilow et al. (U.S. Pat. No. 4,276,407) invented a phenylacetylene terminated oligomer which melts at low temperatures. Grimes and Reinhart (U.S. Pat. No. 4,365,034) patented a new composition of matter comprising an acetylene-terminated polyimide oligomer and a cure rate inhibitor. Bilow et al. (U.S. Pat. No. 3,879,349) prepared polyimide polymers from the homopolymerization of acetylene substituted polyimide oligomers which could be processed into useful articles at moderate temperatures and pressures.

SUMMARY OF THE INVENTION

Mixtures of maleimide-acetylene terminated monomers have the following general primary structure:

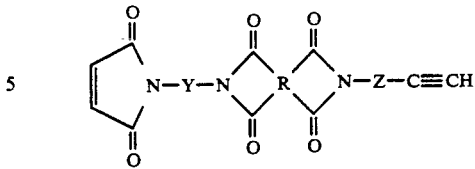

where R, Y, and Z are any aromatic moiety as set forth in detail below.

The two types of unsaturation (double and triple-bonded carbons) allows for the formation of a co-continuous network by polymerizing these monomers with themselves, bismaleimide monomers or oligomers, bis-acetylene monomers or monomers, or mixtures thereof. The maleimide-acetylene terminated oligomeric material is not pure or isolated, but is instead a mixture containing a statistical distribution of bismaleimide, bis-acetylene, and maleimide-acetylene terminated monomers.

This mixture offers several advantages over current isolated (or pure) monomer systems which are polymerized with pure bis-acetylene or bismaleimide monomers or oligomers. The mixture allows for lower melting temperatures and easier processing. Another advantage is an increase in compatibility with bis-acetylene and bismaleimide monomers or oligomers in the melt. This results in an overall reduction in the amount of phase separation and allows for a homogeneous polymer. The resulting polymers from these monomers are more flexible than polymers made from previous maleimide-acetylene monomers.

An object of the present invention is to provide a high temperature polymer which is easier to process and more flexibel by heating a maleimide-acetylene terminated monomeric material to a temperature where it reacts or exotherms.

Another object is to provide high temperature polymers by mixing the maleimide-acetylene terminated monomeric material with acetylene-containing compounds and/or oligomers and heating them to a temperature where they react.

Another object is to provide high temperature polymers by mixing the maleimide-acetylene terminated monomeric material with maleimide containing monomers or oligomers and heating them to a temperature where they react.

Another object is to provide high temperature polymers by mixing the maleimide-acetylene terminated monomeric material with compounds such as N-(3ethynyl-phenyl)maleimide (NEPMI) and heating them to a temperature where they react.

Another object is to provide homogeneous high temperature polymers by mixing the maleimide-acetylene terminated monomeric material with mixtures of maleimide monomers or oligomers and acetylene monomers or oligomers.

DESCRIPTION OF THE PREFERRED EMBODIMENTS

Maleimide-acetylene terminated monomeric materials were prepared and then heated in an open pan at various rates using a DuPont 1090 thermal analyzer to produce high temperature polymers. The monomers were prepared according to the following procedure:

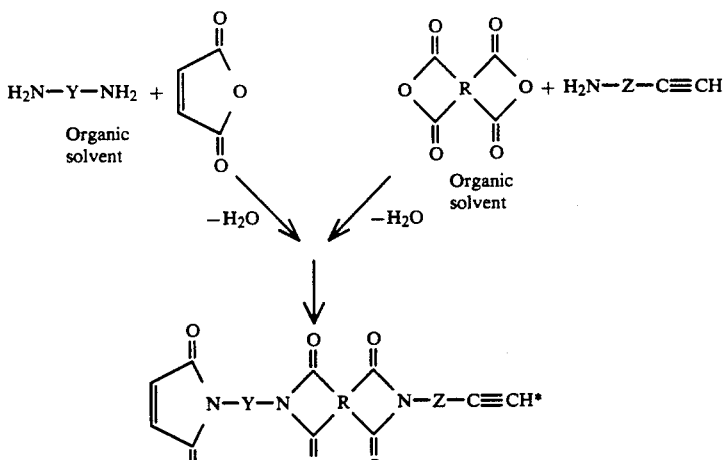

where R, Y, and Z are any aromatic moiety.
*Primary Product

Byproducts such as bismaleimides, bis-acetylenes, and monomers with either maleimide or acetylene terminations were left in with the primary product. This mixture offers several advantages over current isolated monomer systems which are polymerized with pure bis-acetylene or bismaleimide monomers. The mixture allows for lower melting temperatures and easier processing due to a broad processing window. Another advantage is an increase in compatibility with bis-acetylene and bismaleimide monomers or oligomers in the melt as a result of the A-B structure of the monomer. This results in a reduction in the phase separation of the polymer. The monomeric structure also allows for an increase in flexibility and a reduction in the amount of shrinkage of the polymer as compared to polymers made with the previous acetylene-maleimide terminated monomer.

EXAMPLES

EXAMPLE 1

A solution of 0.1 moles (24.83 g/mole) 3,3'-diaminodiphenylsulfone (3,3'-DDS) and 0.1 moles (98.06 g/mole) maleic anhydride (MA) in 100 ml N-dimethyacetamide (DMAc) was prepared. A second solution of 0.1 moles (358.29 g/mole) 3,3',4,4'-sulfonediphthalic anhydride (SO$_2$DPA) and 0.1 moles (117.1512 g/mole) 3-aminophenyl acetylene (APA) in 100 ml DMAc was also prepared. The two solutions were poured together and stirred at room temperature for several hours. Then, 0.2500 g of nickelous acetate and 200 ml of acetic anhydride were added and stirring of the solution was maintained for several hours in order to cyclodehydrate the compound. The maleimide-acetylene terminated monomeric material was isolated from the solution by pouring the solution into a blender half full of ice water. A fine white precipitate was filtered and washed 3 times with deionized water and then vacuum dried for approximately 12 hours at 100° C. Approximately 71 g of the material were isolated. The resulting monomeric material had the following primary structure:

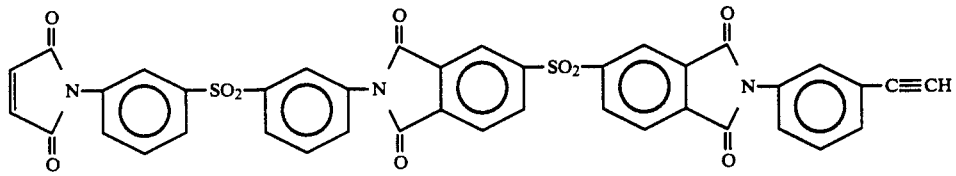

A 5 mg sample of the monomeric material was thermally polymerized by heating in open pans in a thermal analyzer at rates of 10°, 20°, 50° and 100° C./min. Melting transitions were observed between 140°-155° C. depending on the heating rate. After melting, an exotherm, which increased in intensity as the heating rate was increased, was observed at approximately 250°-285° C. and the temperature for the exotherm increased with the heating rate. No glass transition temperatures were observed after heating the polymers to 400° C.

EXAMPLE 2

The maleimide-acetylene terminated monomeric material prepared in Example 1 was blended at a 1:1 molar ratio with NEPMI and was thermally polymerized at 10° and 50° C./min. Melt transitions were observed at 127° and 137° C. at 10° and 50° C./min respectively. After the melt, an exotherm, which increased in intensity as the heating rate was increased, was observed at 225° and 260° C. respectively. No glass transition temperatures were observed after heating the polymer to 400° C. Although NEPMI was the monomer used in this example, any monomer having the following structure can also be used:

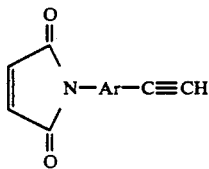

where Ar is any aromatic moiety.

EXAMPLE 3

A maleimide-acetylene terminated monomeric material was prepared. A solution of 0.05 moles (200.242 g/mol) 4,4'-oxydianiline (ODA) and 0.05 moles (98.06 g/mol) maleic anhydride (MA) in 50 ml of DMAc was combined with a solution of 0.05 moles (322.234 g/mol) benzophenonetetracarboxylic dianhydride (BTDA) and 0.05 moles (117.1512 g/mol) APA in 50 ml DMAc. The solutions were blended, cyclized, filtered, and dried as in Example 1. The resulting monomeric material had the following primary structure:

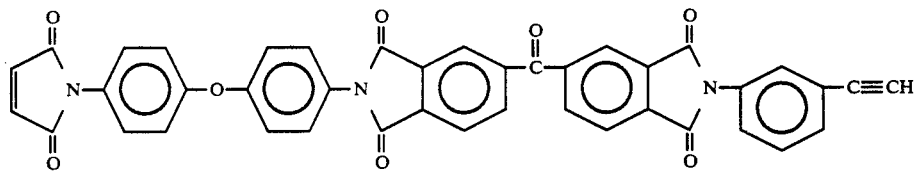

When heated at 10° and 50° C./min, the compound exhibited a strong broad exotherm from 240°-280° C. and 250°-320° C. respectively. No melt transitions were observed nor were any glass transitions noted for the resulting polymer.

EXAMPLE 4

A maleimide-acetylene terminated monomeric material was prepared from a solution of 0.05 moles (218.123 g/mol) of pyromellitic dianhydride (PMDA) and 0.05 moles (117.1512 g/mol) APA in 50 ml DMAc and a solution of 0.05 moles (108.144 g/mol) p-phenylene-diamine (p-PDA) and 0.05 moles (98.06 g/mol) MA in 50 ml DMAc. The two solutions were blended, cyclized, filtered, and dried as in Example 1. The resulting monomeric material had the following primary structure:

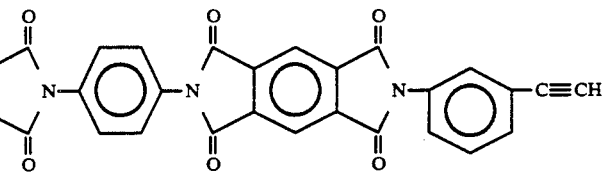

EXAMPLE 5

Each of the three previously prepared maleimide-acetylene terminated monomeric materials were admixed at a 1:1 ratio with a sample of a maleimide of methylene dianiline (BMI) and heated to 300° C. A polymeric glass resulted. Although, BMI was used in this example, any monomer or oligomer of the following general structure can also be used:

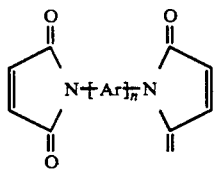

where Ar is any aromatic moiety and n=1-50.

EXAMPLE 6

Each of the three previously prepared maleimide-acetylene terminated monomeric materials were admixed with a sample of a bis-acetylene terminated oligomer, Thermid 600 ®, which is available commercially from National Starch and has the structure:

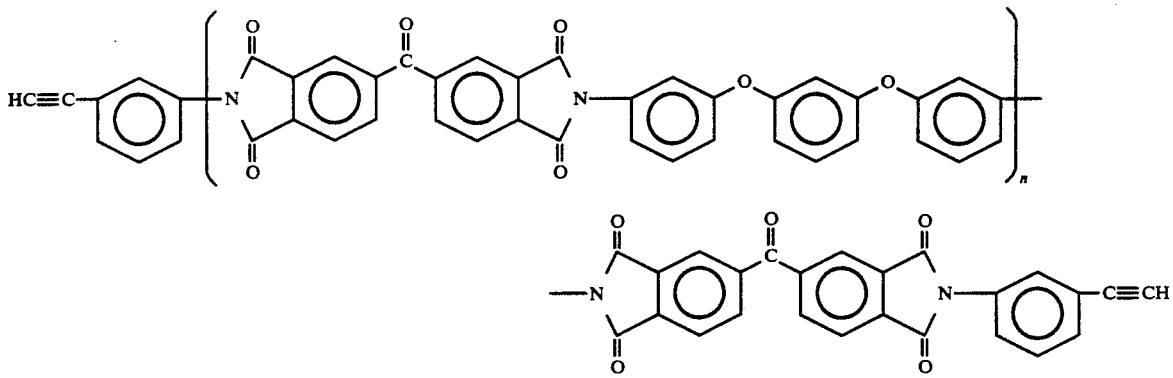

where n=1-10

The mixture was heated to 300° C. and a polymeric glass resulted. Although Thermid 600® was the bis-acetylene terminated oligomer used in this example, other bis-acetylene terminated oligomers having the following general structure may also be used.

HC≡C—(Ar)$_n$—C≡CH where n=1-50 and Ar is any aromatic moiety.

EXAMPLE 7

Each of the three previously prepared maleimide-acetylene terminated monomeric materials are blended with a mixture of Thermid 600® and BMI. The mixture is heated to 300° C. to yield a homogenous polymeric glass.

These thermally stable, glassy polymers are formed from monomers and oligomers that melt and polymerize without the evolution of volatiles. They are easy to process because of their lower melting temperatures.

They exhibit no glass transition up to 400° C. because of their high crosslink densities. Despite their high crosslink densities, the polymers formed from the maleimide-acetylene terminated monomers are more flexible and undergo less shrinkage than those formed from previous maleimide-acetylene monomers. Their A-B structure increases compatibility when they are polymerized with bis-acetylene and bismaleimide monomers and oligomers. These polymers are useful as high temperature composite matrix resins for supersonic aircraft structures in mainframe and engine applications.

What is claimed as new and desired to be secured by Letters Patent of the United States is:

1. A thermally stable, glassy polymer prepared from a monomer composition comprising at least one (I) ethynyl maleimide having the following general primary structural formula:

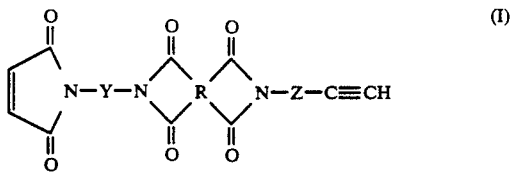

where R, Y, and Z are any aromatic moiety.

2. A thermally stable, glassy polymer according to claim 1, wherein (I) has the following primary structural formula:

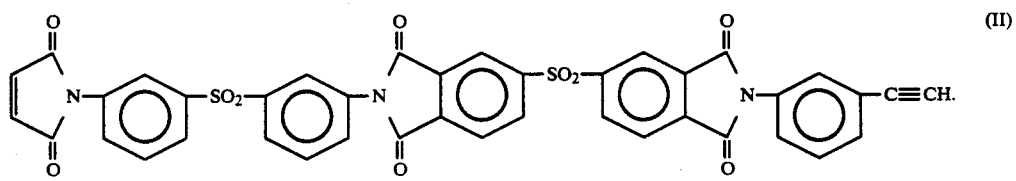

3. A thermally stable, glassy polymeric material according to claim 1, wherein (I) has the following primary structural formula:

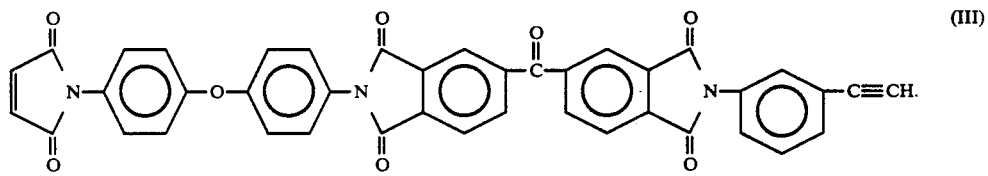

4. A thermally stable, glassy polymer according to claim 1, wherein (I) has the following structural formula:

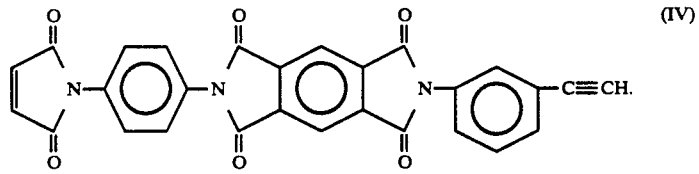

5. A thermally stable, glassy polymer according to claim 2, wherein the monomer composition additionally comprises at least one (V) ethynylimide having the following general formula:

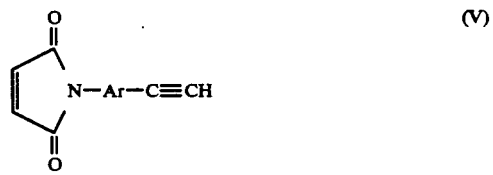

where Ar is any aromatic moiety.

6. A thermally stable, glassy polymer according to claim 3, wherein the monomer composition additionally comprises at least one (V) ethynylimide having the following general formula:

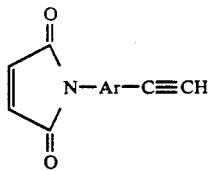

(V)

where Ar is any aromatic moiety.

7. A thermally stable, glassy polymer according to claim 4, wherein the monomer composition additionally comprises at least one (V) ethynylimide having the following general formula:

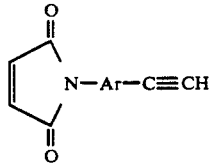

(V)

where Ar is any aromatic moiety.

8. A thermally stable, glassy polymer according to claim 5, wherein (V) has the formula:

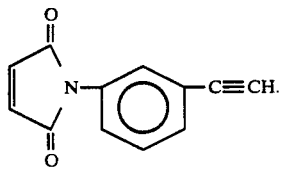

(NEPMI)

9. A thermally stable, glassy polymer according to claim 6, wherein (V) has the formula:

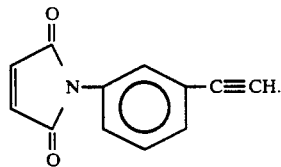

(NEPMI)

10. A thermally stable, glassy polymer according to claim 7, wherein (V) has the formula:

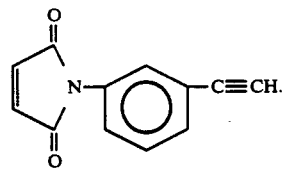

(NEPMI)

11. A thermally stable, glassy polymer according to claim 2, wherein the monomer composition consists of (II).

12. A thermally stable, glassy polymer according to claim 3, wherein the monomer composition consists of (III).

13. A thermally stable, glassy polymer according to claim 4, wherein the monomer composition consists of (IV).

14. A thermally stable, glassy polymer according to claim 2, wherein the monomer composition additionally comprises at least one (VI) bisimide having the general formula:

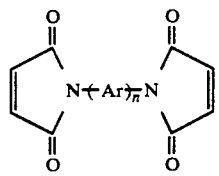

(VI)

n=1-50
where Ar is any aromatic moiety.

15. A thermally stable, glassy polymer according to claim 3, wherein the monomer composition additionally comprises at least one (VI) bisimide having the general formula:

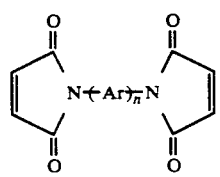

(VI)

n=1-50
where Ar is any aromatic moiety.

16. A thermally stable, glassy polymer according to claim 4, wherein the monomer composition additionally comprises at least one (VI) bisimide having the general formula:

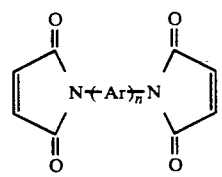

(VI)

n=1-50
where Ar is any aromatic moiety.

17. A thermally stable, glassy polymer according to claim 14, wherein (VI) has the following structure:

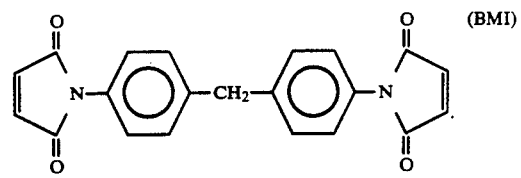

(BMI)

18. A thermally stable, glassy polymer according to claim 15, wherein (VI) has the following structure:

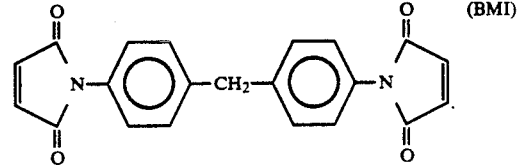

(BMI)

19. A thermally stable, glassy polymer according to claim 16, wherein (VI) has the following structure:

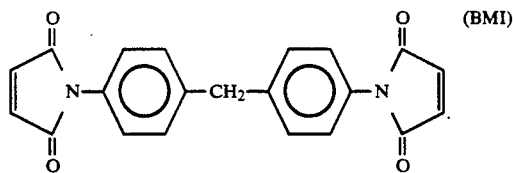

(BMI)

20. A thermally stable, glassy polymer according to claim 2, wherein the monomer composition additionally comprises at least one (VII) bisacetylene having the following general formula:

$$HC\equiv C-(Ar)_n-C\equiv CH \qquad (VII)$$

n = 1-50
where Ar is any aromatic moiety.

21. A thermally stable, glassy polymer according to claim 3, wherein the monomer composition additionally comprises at least one (VII) bisacetylene having the following general formula:

$$HC\equiv C-(Ar)_n-C\equiv CH \qquad (VII)$$

n = 1-50
where Ar is any aromatic moiety.

22. A thermally stable, glassy polymer according to claim 4, wherein the monomer composition additionally comprises at least one (VII) bisacetylene having the following general formula:

$$HC\equiv C-(Ar)_n-C\equiv CH \qquad (VII)$$

n = 1-50
where Ar is any aromatic moiety.

23. A thermally stable, glassy polymer according to claim 20, wherein (VII) has the following structure:

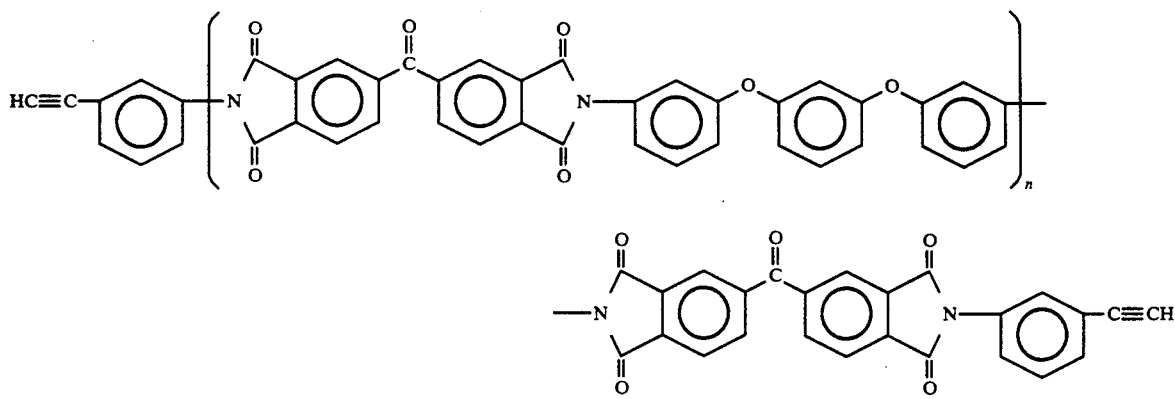

where n = 1-10.

24. A thermally stable, glassy polymer according to claim 21, wherein (VII) has the following structure:

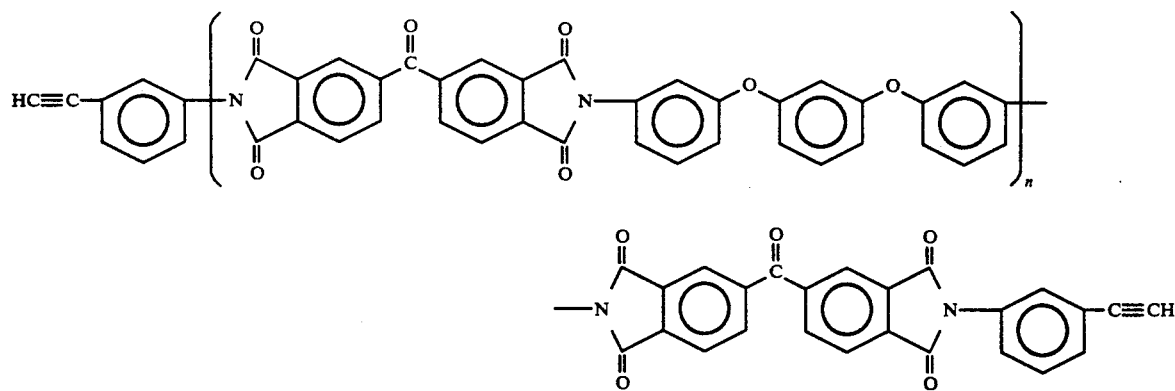

where n = 1-10.

25. A thermally stable, glassy polymer according to claim 22, wherein (VII) has the following structure:

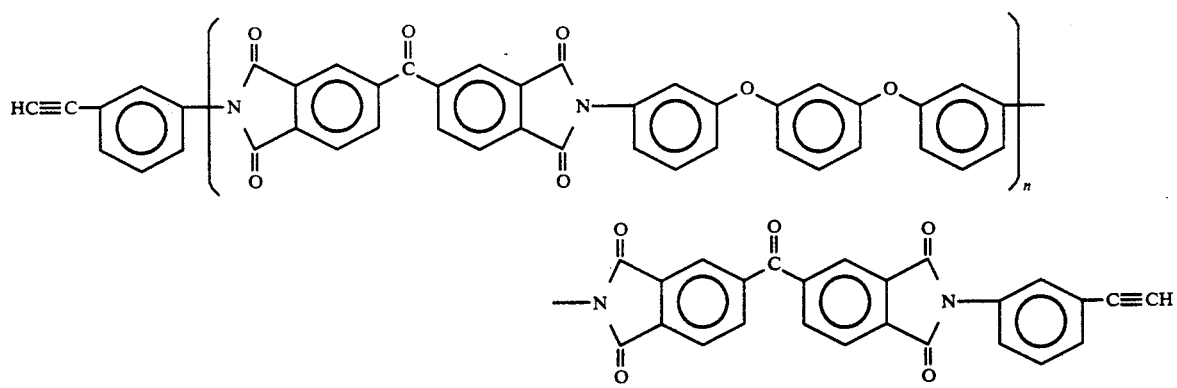

where n = 1-10.

26. A thermally stable, homogenous, glassy polymer prepared from
   a) an acetylene-maleimide terminated monomer having the following general structural formula:

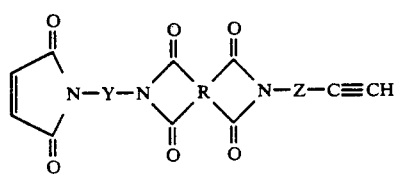

where R, Y, and Z are any aromatic moiety;
   b) a bismaleimide terminated monomer having the following general structural formula:

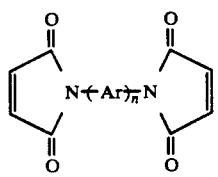

where n = 1-50 and Ar is any aromatic moiety; and
   c) a bis-acetylene terminated monomer having the following general structural formula:

$$HC\equiv C-(Ar)_n-C\equiv CH$$

where n = 1-50 and Ar is any aromatic moiety.

27. A thermally stable, homogenous, glassy polymer according to claim 26, wherein said acetylene-maleimide terminated monomer has the following primary structure:

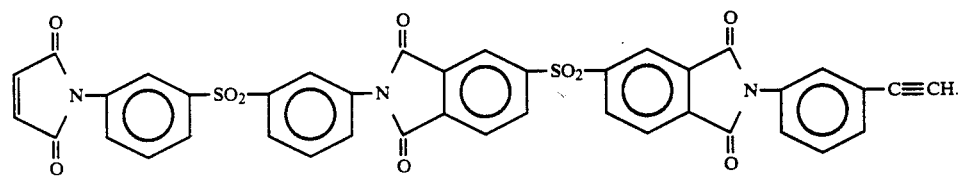

28. A thermally stable, homogenous, glassy polymer according to claim 26, wherein said acetylene-maleimide terminated monomer has the following primary structure:

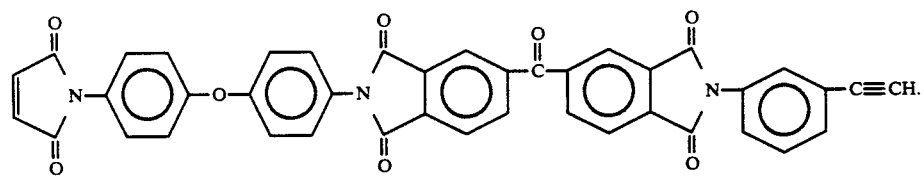

29. A thermally stable, homogeneous, glassy polymer according to claim 26, wherein said acetylene-maleimide terminated monomer has the following primary structure:

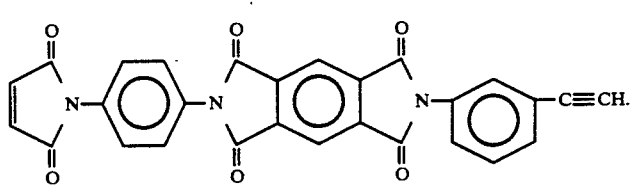

30. A thermally stable, homogeneous, glassy polymer according to claim 26, wherein said bismaleimide terminated monomer has the following structure:
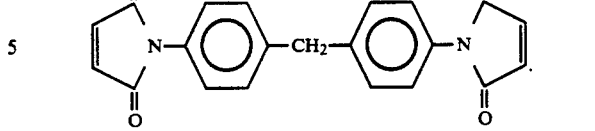
31. A thermally stable, homogenous, glassy polymer according to claim 26, wherein said bis-acetylene terminated monomer has the following structure:
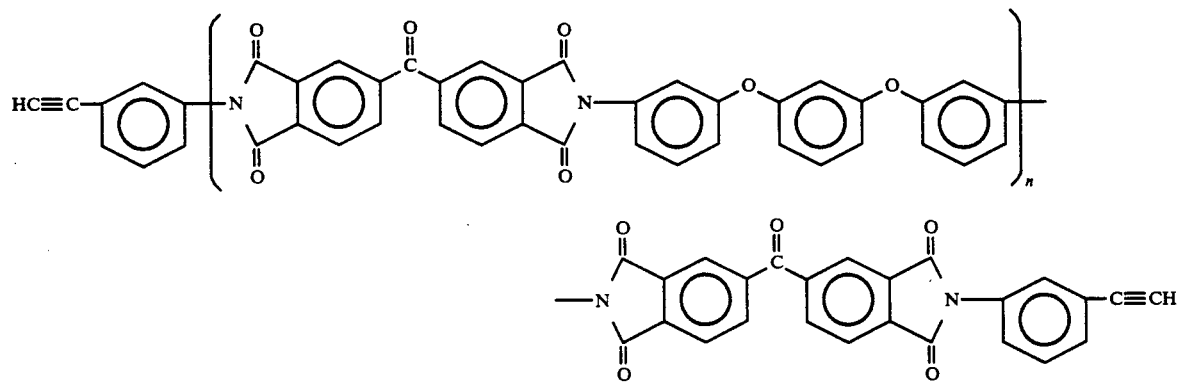
where n = 1-10.
* * * * *